L. STEVENS.
METHOD OF MAKING EXTENSION CROWN HATS.
APPLICATION FILED JUNE 3, 1909.
1,070,554.
Patented Aug. 19, 1913.
2 SHEETS—SHEET 1.
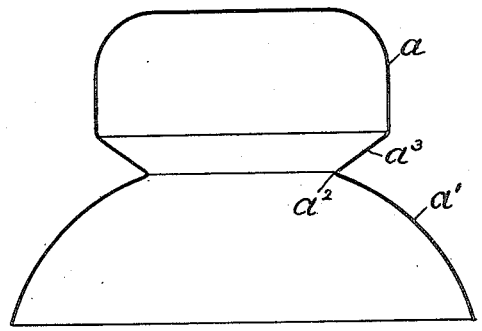
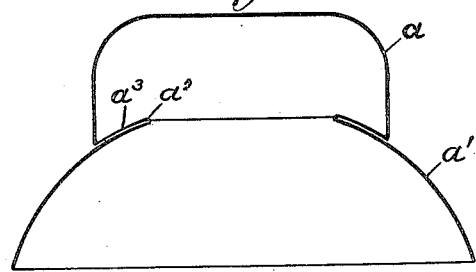
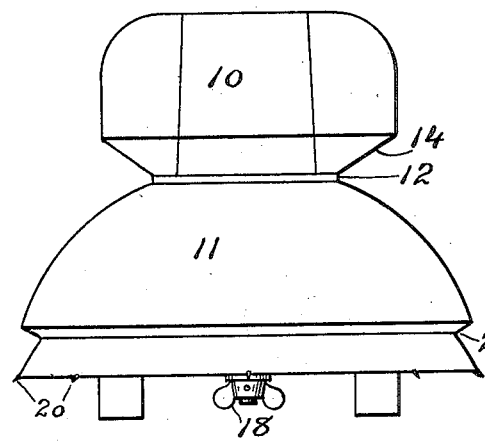
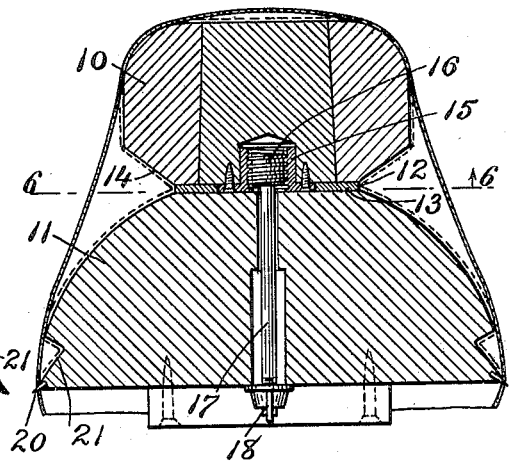
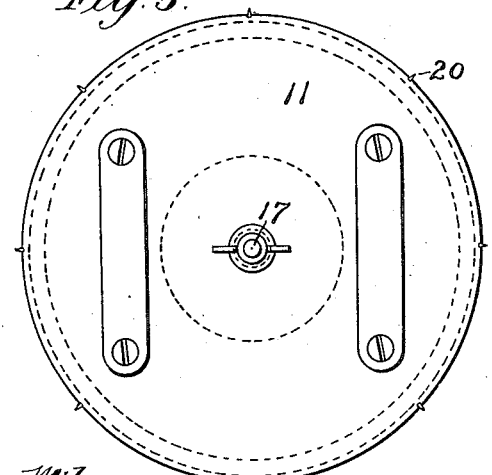
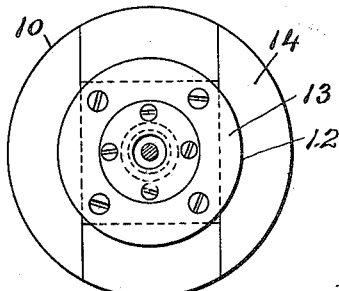
Inventor:
Leslie Stevens
by his Atty:
Arthur L. Kent
Witnesses:
C. B. Schroeder
R. J. DuBois
COLUMBIA PLANOGRAPH CO., WASHINGTON, D. C.

L. STEVENS.
METHOD OF MAKING EXTENSION CROWN HATS.
APPLICATION FILED JUNE 3, 1909.
1,070,554.
Patented Aug. 19, 1913.
2 SHEETS—SHEET 2.
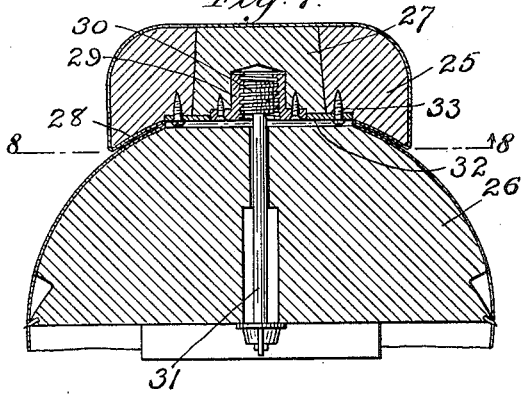
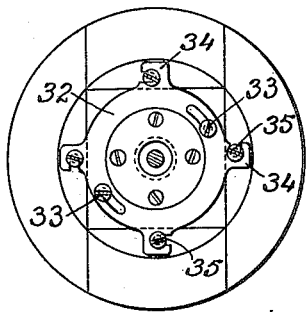
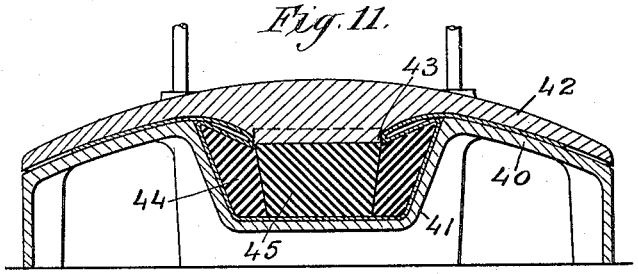
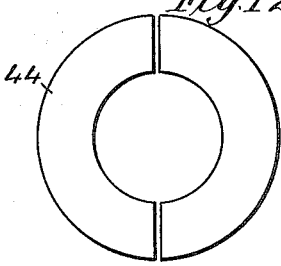
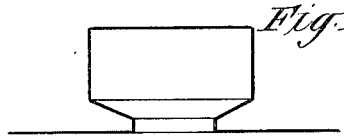
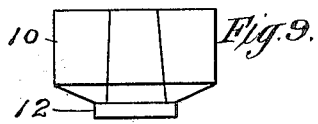
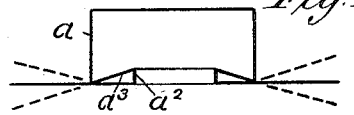
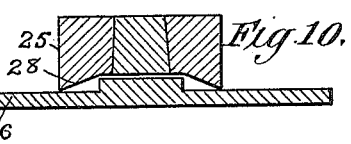
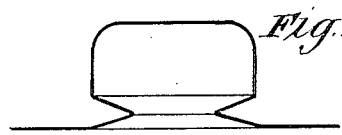
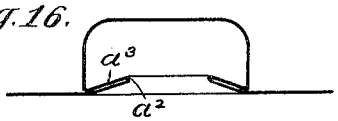
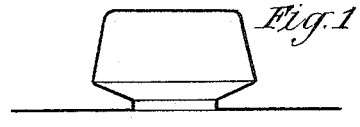
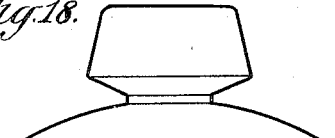
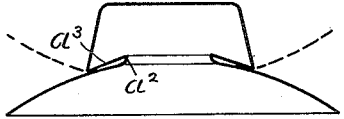
Witnesses:
L. B. Schroeder.
R. G. Du Bois
Inventor:
Leslie Stevens
by his Atty;
Arthur L. Kent

UNITED STATES PATENT OFFICE.

LESLIE STEVENS, OF GLEN RIDGE, NEW JERSEY.

METHOD OF MAKING EXTENSION-CROWN HATS.

1,070,554.   Specification of Letters Patent.   Patented Aug. 19, 1913.

Application filed June 3, 1909. Serial No. 499,904.

*To all whom it may concern:*

Be it known that I, LESLIE STEVENS, a citizen of the United States, residing at Glen Ridge, county of Essex, and State of New Jersey, have invented certain new and useful Improvements in Methods of Making Extension-Crown Hats, fully described and represented in the following specification and the accompanying drawings, forming a part of the same.

This invention relates to a method of shaping hats, and more especially one-piece hats, made of felt or other suitable stretchable and moldable material and of the class or general shape known as extension crown hats, that is, hats in which the head opening is smaller than the lower part of the crown. Such smaller head opening in one-piece hats is formed by an annular fold of the felt extending inwardly from the lower extremity of the crown and from the brim. In one-piece hats of this kind as heretofore made, the crown base or upper layer of such fold, extending from the bottom of the crown to the head band or inner angle of the fold, has been approximately flat, lying in the plane of the bottom of the crown.

The object of the present invention is to produce an extension-crown hat, and more especially a one-piece extension crown hat, having an inset head band, that is, a head band which is set up into the crown above the lower extremity of the crown, and having a crown base which slants upwardly from the lower extremity of the crown to the upper edge of the head band. The desirability of having the head band or bandeau of extension crown hats set up into the crown has long been recognized, and it has been customary to make two-piece hats, that is, hats in which the crown and brim are formed of separate pieces, with such an inset head band. It has been considered impossible, however, to form a one-piece extension crown hat with an inset head band, and such a hat cannot be formed by the methods and with the apparatus heretofore known and used.

In making such hats in accordance with the method of the present invention, the hat is first shaped with an outstanding head band, that is, one standing below or beyond the plane of the bottom or lower extremity of the crown, and with a crown base slanting downwardly from the crown and the head band, and the head band and crown base are then forced inward toward the top of the crown of the hat so as to reverse the slant of the crown base and set the head band in the desired position above the plane of the bottom or lower extremity of the crown. The hat is thus first formed to a shape which is less rather than more difficult to produce than the one-piece extension crown hats having a flat crown base as heretofore made, and then by the simple operation of reversing the slant of the crown base a hat is produced which is in itself new and which cannot be made by the methods heretofore known and used.

The head band may be of any desired width, or may be formed merely by a sharp bend of the felt at the junction of the inner extremities of the crown base and brim. If it is of a width considerably less than the distance between the planes of the upper and lower extremities or edges of the slanting crown base, then before the head band and crown base are set into the crown, the brim or the inner portion thereof should preferably be suitably shaped to roll or flare downwardly so as not to interfere with the insetting of the head band and crown base. The amount of inclination or slant to be given to the inner portion of the brim will depend upon the slant and width of the crown base and the width of the head band. It should preferably be such that the distance between the plane passing through the portion of the brim which is to be adjacent to the lower extremity of the crown in the completed hat and the plane of the inner or lower extremity of the downwardly slanting crown base will be slightly less than the distance between the plane of the lower extremity of the crown base and the plane of the line of junction between the upper extremity of the crown base and the lower extremity of the sides of the crown. With these parts so shaped and proportioned, when the head band is forced up into the crown, the crown base, being simply reversed so as to slant upwardly instead of downwardly, will tend to hold the head band and brim in position with the head band properly inset and the brim close against the lower extremity of the crown.

The crown of the hat may be of any desired shape, size and proportions, and may have a head opening of any desired size and shape, and the brim of the finished hat may be flat or may have any desired up or down roll or straight flare.

In making hats in accordance with the invention, any suitable devices and mechanism may be employed for shaping the hat with an outstanding head band and downwardly inclined crown base and for setting the hat to final form with an inset head band. Blocking or shaping devices or forms and setting forms, such as are hereinafter fully described, are preferably employed, however, and such blocking or shaping devices and setting forms may be employed in connection with or as part of suitable organized machines, or may be used in making hats by hand. The blocking or shaping apparatus or forms described herein are claimed in a divisional application, filed July 17, 1913, Ser. No. 779,491.

To give a full understanding of the invention, a description will now be given in connection with the accompanying drawings, illustrating the making of hats in accordance with the invention and showing several styles of hats made in accordance with the invention, and shaping and setting forms employed in shaping and setting the hats.

In said drawings:—Figure 1 is a diagrammatic sectional view of a hat as shaped with an outstanding head band and downwardly slanting crown base. Fig. 2 is a similar view of the hat shown in Fig. 1 after being set to its final shape. Fig. 3 shows in elevation a blocking device for shaping a hat to the shape shown in Fig. 1. Fig. 4 is a section on line 4 of Fig. 3, showing also a hat body in position ready to be shaped. Fig. 5 is a view of the base of the brim board or brim form of the forming device shown in Figs. 3 and 4. Fig. 6 is a view of the base or outer face of the crown form or block taken on line 6 of Fig. 4. Fig. 7 is a sectional view of a combined crown form and brim form for setting to final shape hats which have been shaped on the forming device shown in Figs. 3 and 4. Fig. 8 is a view taken on line 8 of Fig. 7, showing the base or outer face of the crown form or block of said figure. Fig. 9 is an elevation of a modified form of crown block for shaping hats with an outstanding head band. Fig. 10 is a diagrammatic sectional view showing the shape of a crown block and brim board for setting to final shape a hat which has been shaped on a block such as shown in Fig. 9. Fig. 11 is a sectional view illustrating the use of dies for setting to final shape a hat which has been shaped with an outstanding head band. Fig. 12 is a view of the base or outer face of a portion of the interior crown form shown in connection with the dies shown in Fig. 11. Fig. 13 is a diagrammatic sectional view of a hat with a wide outstanding head band shaped on a block such as shown in Fig. 9. Fig. 14 is a similar view of the hat shown in Fig. 13 when set to final shape. Figs. 15 to 19 illustrate the making of modified shapes of hats in accordance with the invention.

Referring to the drawings, Fig. 2 shows a one-piece extension crown hat shaped in accordance with the invention, having a dome shaped crown $a$ and a downwardly rolled brim $a'$, and having a narrow inset head band $a^2$ formed by the sharp bend of the felt between the inner portion of the brim and an upwardly slanting crown base $a^3$. To produce such a hat, the hat is first shaped to the form shown in Fig. 1, the brim being of the same shape as shown in Fig. 2, and the crown being of the same shape as shown in Fig. 2 except that the crown base slants downwardly from the crown to the outstanding head band $a^2$. After the hat is shaped as shown in Fig. 1, the head band and downwardly slanting crown base are forced upward toward the top of the crown and into the crown, thereby reversing the slant of the crown base and insetting the head band and bringing the crown and brim to the relative positions shown in Fig. 2.

Figs. 3 to 6 illustrate a form of combined crown block and brim form which is preferably employed in shaping hats with an outstanding head band and downwardly inclined crown base. The device as shown comprises a crown block or form 10, and a brim board or flange 11. The crown block will be a sectional block of wood or other suitable material and of suitable construction to permit the sections to be withdrawn separately from a formed hat. The sides and top of the block will be of any desired form, according to the desired shape of the crown of the hat. The base or outer face of the block is provided with a forming shoulder 12 for determining the size and shape of the head opening of the hat, such forming shoulder being formed by the edge of a plate 13 secured to the medial section of the block; and the portion of the base or outer face of the block surrounding the shoulder 12 is beveled or inclined so as to form a convexly inclined forming surface 14. Set into an opening in the plate 13 and the recess in the medial section of the block is a screw socket 15 for receiving a threaded head 16 carried by a bolt 17 which extends through the brim board and is adapted to be turned by a thumb head 18 for securing the block and brim board together and for releasing the same to permit them to be separated. The brim board, which may also be of wood or other suitable material is formed with a flat top of the size of the shoulder plate 13 and is convexly inclined beyond the flat top with a curved or straight inclined surface formed according to the roll or flare to be given to the brim of the hat.

When a hat is to be blocked or shaped, the crown block and brim form will be secured together, as shown in Figs. 3 and 4, and the felt or other material which is to be shaped will be placed over the form and its edges caught on the pins 20, as shown in Fig. 4. A cone shaped hat body is preferably used, especially if the hat is to be shaped on the form by hand, and the body will be steamed to make it properly soft and stretchable. After being placed on the forming device, and being suitably softened, the sides of the hat body will be drawn and stretched inward into the angle between the convexly inclined faces of the crown block and brim board and against the forming shoulder 12, as indicated by dotted lines in Fig. 4. In pulling the hat by hand this may be done by the use of a cord or other suitable means whereby the required drawing strain may be exerted to stretch the felt inward to the forming shoulder 12. After the felt is thus stretched into the angle between the crown form and brim board, the edge portion of the felt may be drawn into the groove 21 of the brim board by means of a cord or otherwise, and any unevenness pulled out of the brim. The felt will thus be stretched over and caused to conform to, the whole forming surface of the combined crown form and brim board, as indicated by dotted lines in Fig. 4. The hat thus shaped will be allowed to dry, and after the felt has become sufficiently set and hardened, the connection between the brim board and the crown block will be loosened and the brim board removed, and the crown block will then be removed, leaving a hat shaped as shown in Fig. 1.

After the hat has been formed with the outstanding head band and downwardly inclined crown base, the head band and the crown base may be forced inward toward the top of the crown to bring the hat to its final shape in any suitable manner and with the aid of any suitable means. Preferably, however, in order to facilitate the operation and to insure the proper setting of the crown base and head band in their reversed positions, setting means such as shown in Figs. 7, 10 and 11, or their equivalents, are used, such means including an interior crown-setting form having a concavely inclined setting face or surface against which the crown base is set in its reversed position.

Referring to Figs. 7 and 8, the setting device shown in these figures includes a crown form or block 25, and brim form 26 which as shown is the same as the brim form shown in Figs. 3 and 4, and which in any case will have its shaping or setting face shaped according to the shape to be given to the brim. The crown form or block 25 as shown in Fig. 7 is a sectional block of wood or other suitable material, having a plurality of marginal sections and a medial section 27 adapted to be withdrawn from the marginal sections by being pulled from or pushed toward the base or outer side of the block, that is, the lower side as the block appears in Fig. 7. The base or outer face of the block is formed with a concavely inclined setting face 28 extending inward from the sides of the block, and the medial section of the block is formed with a recess in which is set a threaded socket 29 for receiving the threaded head 30 of a bolt 31 by which the brim form and crown form are secured and drawn together. In order to prevent the medial section of the crown block from being drawn out from the marginal sections of the block when the screw bolt 31 is turned to draw the two blocks together, a locking plate 32 is mounted on the outer face of the medial section of the block by screws or studs 33 extending through slots in the locking plate so as to permit the plate to be shifted. The locking plate is provided with a number of slotted ends 34, one for each of the marginal sections of the block, and these ends extend over the adjacent portions of the marginal sections in position to be moved beneath the heads of studs 35 on the marginal sections. In use, the sectional crown block is assembled in the crown of the hat shaped as shown in Fig. 1, and the locking plate 32 is thrown to lock the medial section of the block to the marginal sections. The brim board 26 is then placed beneath the brim of the hat and the two forms are moved toward each other and secured and forced together by means of the screw bolt 31. The crown base, head band and inner portion of the brim are thereby forced upward to the position shown in Figs. 7 and 2 being caused to lie evenly and without wrinkles or folds in the desired position. The crown and brim of the hat may then be ironed or subjected to other finishing operations. Before the hat is thus set in its final shape, the downwardly inclined crown base and the portion of the brim adjacent to the head band are preferably softened to render the reversal of the crown base easier and to insure a better and more even setting of the crown base in its reversed position.

When the brim form 27 and crown form 25 are removed from the hat, the hat will have the shape shown in Fig. 2, and by reason of the method followed in shaping the hat it will retain its shape with the crown base slanting upward from the crown to the head band and with the lower edge of the sides of the crown set down close against the brim.

In order to secure the best results, it is desirable that the slant or inclination of the crown base of the hat as shaped with an outstanding head band, and the inclination or slant of the inner portion of the brim, shall be relatively such that the distance between the planes of the outer and inner edges respectively of the crown base shall be somewhat greater than the distance between the plane of the inner edge of the crown base and a plane passing through that portion of the brim which will lie adjacent to the outer edge of the crown base in the finished hat. With these parts so inclined, while the inclination of the brim will be sufficient to permit a reversal of the slant of the crown base before the brim comes against the lower extremity of the crown or the outer portion of the crown base, yet the crown base will be held in a position in which it will be under some tension to move farther upward or inward, and will therefore tend to hold the crown and brim closely together.

Fig. 9 shows a form of block for shaping a hat with a wide head band, the block differing from the crown block of Figs. 3 and 4 in having a wider forming shoulder 12. On this block hats may be shaped as shown in Fig. 13. As the width of the head band is nearly equal to the drop of the inner edge of the crown base below the bottom of the crown, the inner portion of the brim is left flat, and the lower edge of the head band when the hat has been set to final shape as shown in Fig. 14 will lie about in the plane of the bottom of the crown. A crown setting form and brim board such as shown in Fig. 10 may be employed in setting such a hat, the brim board being shown as a flat board for setting a hat with a flat brim. A hat otherwise of the shape shown in Fig. 14 might of course be made with an upwardly or downwardly flared brim as indicated by dotted lines in Fig. 14, or with an upwardly or downwardly rolled brim.

Figs. 15 and 16 illustrate the making of a hat with a flat brim and a narrow inset head band; and Figs. 17, 18 and 19 show the production of a hat with a head band of a width intermediate between that shown in Fig. 14 and that of Figs. 2 and 16.

Hats which are to have a final shape as shown in Fig. 19 might be first shaped as shown in Fig. 17 and then have the brim flanged as shown in Fig. 18 before being set to final shape, or might be shaped directly to the shape of Fig. 18. So also after being shaped as shown in Fig. 17, the hat might be set to final shape and have its brim flanged at a single operation.

Fig. 11 shows a pair of dies adapted for setting to final shape a hat which has been shaped with an outstanding head band and downwardly slanting crown base. The dies shown are formed for setting a hat of the shape shown in Fig. 19. The lower die 40 is formed with a depressed portion or bowl 41 for receiving the crown of the hat, and the surface of the die is shaped to conform to the outside of the crown of the hat and the upper side of the brim beyond the crown. The upper die 42 is shaped to conform to the under side of the brim of the hat and has a central boss 43, of the form and size of the head opening of the hat. A crown block having a concavely inclined surface for setting the crown base is used with the dies, as shown, and I preferably use with such dies a crown block of rubber or other suitable flexible and elastic material made up of an outer ring 44 and a central plug 45. The ring 44 is formed with the concavely inclined surface for setting the crown base and is made to fit loosely in the hat when not under pressure from the plug and is cut across in one or more places so that it may be readily placed in the hat. It may for example, be cut across at two places or formed of two pieces, as shown in Fig. 12. The plug 45 is also made of a size to fit easily in place in the ring, and is made of such a depth, as indicated by dotted lines in Fig. 11, that when the dies are brought together the plug will be compressed vertically and caused to expand laterally and press against the ring and press the ring outward and also cause it to expand to fit tightly against the inside of the hat. The dies may be suitably heated and may be used in any suitable stamping or die press.

What is claimed is:

1. The method of shaping one-piece extension-crown hats having inset head bands, which consists in shaping the hat with an outstanding head band and a crown base slanting downwardly from the crown to the head band, and then forcing the head band and the crown base inward toward the top of the crown to reverse the slant of the crown base.

2. The method of shaping one-piece extension crown hats having inset head bands, which consists in shaping the hat with an outstanding head band and a crown base slanting downwardly from the crown to the head band and with the brim shaped so that the part of the brim which is to be adjacent to the lower extremity of the crown in the completed hat lies in a plane beyond the plane of the inner edge of the crown base, and that the distance between said planes is less than the distance between the plane of the inner edge of the crown base and the plane of the outer edge of the crown base, and then forcing the head band and crown base inward toward the top of the crown to reverse the slant of the crown base, whereby the head band will be inset and the brim will be caused to hug the bottom of the crown.

3. The method of shaping one piece extension crown hats having inset head bands, which consists in shaping the crown and brim with an outstanding head band and a crown base slanting downwardly from the crown to the head band, and then softening the crown base and the portion of the brim adjacent to the head band and setting the hat to final shape with the head band inset and the slant of the crown base reversed.

4. The method of shaping hat crowns, which consists in shaping the crown with a crown base slanting downwardly from the crown to the head opening, and then forcing the crown base inward toward the top of the crown to reverse its slant.

In testimony whereof, I have hereunto set my hand, in the presence of two subscribing witnesses.

LESLIE STEVENS.

Witnesses:
LAURA E. SMITH,
R. G. DU BOIS.

---

Copies of this patent may be obtained for five cents each, by addressing the "Commissioner of Patents, Washington, D. C."